United States Patent
McIsaac et al.

(10) Patent No.: US 10,686,757 B2
(45) Date of Patent: *Jun. 16, 2020

(54) ELECTRONIC MESSAGE ADDRESS ALIASING

(71) Applicant: Reflexion Networks, Inc., Woburn, MA (US)

(72) Inventors: Joseph E. McIsaac, Sharon, MA (US); Marcus Dahllof, Newton, MA (US); Louis Bruce Tatarsky, Haverhill, MA (US); Richard K. Vallett, Wilmington, MA (US)

(73) Assignee: Reflexion Networks, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,968

(22) Filed: Sep. 27, 2015

(65) Prior Publication Data

US 2016/0028686 A1     Jan. 28, 2016

Related U.S. Application Data

(63) Continuation of application No. 14/465,506, filed on Aug. 21, 2014, now abandoned, which is a
(Continued)

(51) Int. Cl.
*H04L 29/12* (2006.01)
*H04L 12/58* (2006.01)
(Continued)

(52) U.S. Cl.
CPC ......... *H04L 61/6013* (2013.01); *H04L 51/12* (2013.01); *H04L 61/2069* (2013.01);
(Continued)

(58) Field of Classification Search
CPC .. H04L 29/06027; H04L 51/12; G06Q 10/107
(Continued)

(56) References Cited

U.S. PATENT DOCUMENTS

| 5,930,479 | A |   | 7/1999  | Hall et al. |            |
|-----------|---|---|---------|-------------|------------|
| 5,970,122 | A | * | 10/1999 | LaPorta     | H04M 3/5307 |
|           |   |   |         |             | 340/7.23   |

(Continued)

FOREIGN PATENT DOCUMENTS

| JP | 2000339236 | 12/2000 |
| JP | 2002073475 | 3/2002 |

(Continued)

OTHER PUBLICATIONS

EPO, "EP Application Serial No. 03785164.9, Examination Report dated May 23, 2016", 6 pages.

(Continued)

*Primary Examiner* — Bryan F Wright
(74) *Attorney, Agent, or Firm* — Strategic Patents, P.C.

(57) ABSTRACT

A method may include receiving an outbound communication directed to one or more recipient addresses from a communications infrastructure hosting the true address for the user. A server or similar intermediary may generate an alias address for each recipient address in an outbound communication so that each recipient may communicate with the true address using a unique reply channel. A discrete security state may be assigned as a security attribute to each such alias address. The discrete security state, which can be controlled by the user and stored, e.g., at the intermediate server, establishes rules for controlling communications from one of the recipient addresses through the communications infrastructure to the true address via one of the alias addresses. Once an alias and a security state are assigned in this manner to facilitate handling of responsive (Continued)

communications, the outbound communication may be forwarded to recipient addresses through the communication network.

15 Claims, 15 Drawing Sheets

Related U.S. Application Data continuation of application No. 13/540,703, filed on Jul. 3, 2012, now Pat. No. 8,850,555, which is a continuation of application No. 12/909,351, filed on Oct. 21, 2010, now Pat. No. 8,239,471, which is a continuation of application No. 10/523,760, filed as application No. PCT/US03/25067 on Aug. 11, 2003, now Pat. No. 7,870,260.

(60) Provisional application No. 60/402,574, filed on Aug. 9, 2002.

(51) Int. Cl.
*H04L 29/06* (2006.01)
*G06Q 10/10* (2012.01)

(52) U.S. Cl.
CPC .......... *H04L 63/10* (2013.01); *H04L 65/4076* (2013.01); *G06Q 10/107* (2013.01); *H04L 29/12594* (2013.01); *H04L 51/14* (2013.01); *H04L 51/28* (2013.01); *H04L 61/301* (2013.01); *H04L 61/307* (2013.01); *H04L 63/0254* (2013.01); *H04L 63/102* (2013.01)

(58) Field of Classification Search
USPC ........................................................ 709/206
See application file for complete search history.

(56) References Cited

U.S. PATENT DOCUMENTS

| | | | |
|---|---|---|---|
| 5,987,508 A * | 11/1999 | Agraharam | H04L 29/12594 379/93.24 |
| 5,999,932 A | 12/1999 | Paul | |
| 6,112,227 A | 8/2000 | Heiner et al. | |
| 6,161,129 A * | 12/2000 | Rochkind | G06Q 10/107 709/204 |
| 6,167,459 A * | 12/2000 | Beardsley | G06F 13/102 710/3 |
| 6,192,114 B1 | 2/2001 | Council et al. | |
| 6,199,102 B1 | 3/2001 | Cobb et al. | |
| 6,301,608 B1 * | 10/2001 | Rochkind | H04L 51/12 379/93.24 |
| 6,321,267 B1 * | 11/2001 | Donaldson | H04L 51/12 370/351 |
| 6,377,993 B1 | 4/2002 | Brandt et al. | |
| 6,473,406 B1 | 10/2002 | Coile et al. | |
| 6,574,658 B1 * | 6/2003 | Gabber | G06Q 10/107 709/206 |
| 6,591,291 B1 | 7/2003 | Mayer et al. | |
| 6,614,800 B1 * | 9/2003 | Genty | H04L 12/4641 370/464 |
| 6,643,687 B1 | 11/2003 | Dickie et al. | |
| 6,801,931 B1 * | 10/2004 | Ramesh | G06Q 10/107 704/260 |
| 6,836,805 B1 * | 12/2004 | Cook | G06F 21/31 709/227 |
| 6,868,498 B1 * | 3/2005 | Katsikas | G06Q 10/107 709/217 |
| 6,941,348 B2 | 9/2005 | Petry et al. | |
| 6,985,479 B2 | 1/2006 | Leung et al. | |
| 7,058,684 B1 | 6/2006 | Ueda et al. | |
| 7,092,942 B2 | 8/2006 | Frieden et al. | |
| 7,092,992 B1 * | 8/2006 | Yu | H04L 51/12 709/206 |
| 7,376,629 B1 * | 5/2008 | McIsaac | G06Q 20/027 705/50 |
| 7,472,422 B1 | 12/2008 | Agbabian et al. | |
| 7,617,328 B2 * | 11/2009 | Lewis | H04L 12/2856 709/206 |
| 7,698,433 B2 | 4/2010 | Gallant et al. | |
| 7,783,741 B2 | 8/2010 | Hardt et al. | |
| 7,870,260 B2 | 1/2011 | McIsaac et al. | |
| 8,239,471 B2 | 8/2012 | McIsaac et al. | |
| 8,850,555 B2 | 9/2014 | Vallett et al. | |
| 2001/0014097 A1 * | 8/2001 | Beck | H04L 45/00 370/401 |
| 2001/0049745 A1 * | 12/2001 | Schoeffler | H04L 51/14 709/238 |
| 2002/0002615 A1 | 1/2002 | Bhagavath et al. | |
| 2002/0032853 A1 | 3/2002 | Preston et al. | |
| 2002/0052972 A1 | 5/2002 | Yim et al. | |
| 2002/0087641 A1 * | 7/2002 | Levosky | H04L 51/12 709/206 |
| 2002/0129108 A1 * | 9/2002 | Sykes, Jr. | G06Q 10/107 709/206 |
| 2002/0138581 A1 * | 9/2002 | MacIntosh | G06Q 10/107 709/206 |
| 2002/0152272 A1 | 10/2002 | Yairi et al. | |
| 2002/0165969 A1 * | 11/2002 | Gallant | H04L 12/14 709/227 |
| 2003/0001889 A1 * | 1/2003 | Darby | H04L 12/58 715/752 |
| 2003/0009385 A1 * | 1/2003 | Tucciarone | G06Q 10/107 705/26.1 |
| 2003/0051057 A1 | 3/2003 | Garnett et al. | |
| 2003/0158905 A1 | 8/2003 | Petry et al. | |
| 2003/0158960 A1 | 8/2003 | Engberg et al. | |
| 2003/0169859 A1 * | 9/2003 | Strathmeyer | H04L 29/06027 379/88.17 |
| 2003/0200334 A1 * | 10/2003 | Grynberg | G06Q 20/383 709/245 |
| 2004/0003041 A1 | 1/2004 | Moore et al. | |
| 2004/0123153 A1 | 6/2004 | Wright et al. | |
| 2004/0148358 A1 * | 7/2004 | Singh | G06Q 10/107 709/207 |
| 2005/0038893 A1 | 2/2005 | Graham et al. | |
| 2005/0114453 A1 | 5/2005 | Hardt et al. | |
| 2007/0083425 A1 | 4/2007 | Cousineau et al. | |
| 2019/0312837 A1 | 10/2019 | Mcisaac et al. | |

FOREIGN PATENT DOCUMENTS

| | | |
|---|---|---|
| WO | WO-199818249 | 4/1998 |
| WO | WO-200116695 | 3/2001 |

OTHER PUBLICATIONS

"International Application Serial No. PCT/US2003/025067, Search Report dated Dec. 9, 2003", 6 pages.
"International Application Serial No. PCT/US2003/025067, Written Opinion dated Feb. 10, 2005", 5 pages.
IPEA/US, "PCT Application No. PCT/US2003/025067", 3 Pages.
USPTO, "U.S. Appl. No. 10/523,760 Final Office Action dated Feb. 18, 2009", 32 Pages.
USPTO, "U.S. Appl. No. 10/523,760 Final Office Action dated Jun. 28, 2010", 40 Pages.
USPTO, "U.S. Appl. No. 10/523,760 Non-Final Office Action dated Oct. 1, 2009", 34 pages.
USPTO, "U.S. Appl. No. 10/523,760 Non-Final Office Action dated Jun. 9, 2008", 31 Pages.
USPTO, "U.S. Appl. No. 10/523,760 Notice of Allowance dated Aug. 23, 2010", 10 pages.
USPTO, "U.S. Appl. No. 11/137,031 Non-Final Office Action dated Jan. 9, 2009", 19 pages.
USPTO, "U.S. Appl. No. 12/909,351 Non-Final Office Action dated Jul. 11, 2011", 9 pages.
USPTO, "U.S. Appl. No. 12/909,351 Notice of Allowance dated Apr. 6, 2012", 11 pages.

(56) References Cited

OTHER PUBLICATIONS

USPTO, U.S. Appl. No. 13/540,703 Non-Final Office Action dated Apr. 26, 2013, 9 pages.
USPTO, "U.S. Appl. No. 13/540,703 Non-Final Office Action dated Sep. 25, 2013", 12 pages.
USPTO, "U.S. Appl. No. 13/540,703 Notice of Allowance dated May 23, 2014", 10 pages.
USPTO, "U.S. Appl. No. 14/465,506 Non-Final Office Action dated Mar. 27, 2015", 16 pages.

* cited by examiner

*Address Translations*

"True" Identifiers (UE_True table) — 500
- T1 = Inside Identifier 1
- T2 = Outside Identifier 1
- T3 = Outside Identifier 2
- T4 = Inside Identifier 2
- Tn = Outside Identifier n

Proxy Identifiers (UE_Alias table) — 502
- $P_{(T2,T1)}$ = Substitute identifier for T1, registered to T2
- $P_{(T3,T1)}$ = Substitute identifier for T1, registered to T3
- $P_{(Tx,T1)}$ = Substitute identifier for T1, registered to Tn
- $P_{(Tx,Tx)}$ = Tx, registered to Tx

- s = sender identity
- r = recipient identity
- a = An address reference to translate
- M(s,r) = A message from s to r — 504
- T(a) = Method that returns translation of address a for a message from s to r
- $D_{(Tx,T1)}$ = Method that returns proxy P that Tx uses to send e-mail to T1
- 506 Sometimes $D_{(Tx,T1)} <> P_{(Tx,T1)}$ INBOUND, Successfully past security, where:

1. $a = r$, $s = T2$, $r = P_{(T2,T1)}$, then $T(a) = T1$

2. $a = r$, $s = T2$, $r = P_{(T3,T1)}$, then $T(a) = T1$

3. $a = P_{(T4,T4)}$, $s = T2$, $r = P_{(T2,T1)}$, then $T(a) = T4$

4. $a = P_{(T4,T4)}$, $s = T2$, $r = P_{(T3,T1)}$, then $T(a) = T4$

5. $a = T3$, $s = T2$, $r = P_{(Tx,T1)}$, then $T(a) = T3$

6. $a = P_{(Tx,Ty)}$, $s = T2$, T2 is exempt, $r$ = any P, then $T(a) = Ty$

OUTBOUND, no security on outbound, where:

7. $a = r$, $s = T1$, $r = T2$, then $T(a) = P_{(T2,T1)}$

8. $a = r$, $s = T1$, $r = T2$, $D_{(T2,T1)} <> P_{(T2,T1)}$, then $T(a) = D_{(T2,T1)}$ 9. $a = r$, $s = T1$, $r = T2$, $D_{(T2,T1)} = P_{(T2,T1)}$, then $T(a) = P_{(T2,T1)}$ 10. $a = r$, $s = T1$, $r = T2$, $r$ is exempt, then $T(a) = P_{(T1,T1)}[s]$ 11. $a = T3$, $s = T1$, $r = T2$, then $T(a) = P_{(T3,T1)}$ 12. $a = T3$, $s = T1$, $r = T2$, $D_{(T3,T1)} <> P_{(T3,T1)}$, then $T(a) = D_{(T3,T1)}$ 13. $a = T3$, $s = T1$, $r = T2$, $D_{(T3,T2)} = P_{(T2,T1)}$, then $T(a) = P_{(T2,T1)}$ 14. $a = T3$, $s = T1$, $r = T2$, T3 is exempt, then $T(a) = P_{(T1,T1)}[s]$

FIG. 5

E-mail address

Login for authorized users only

Password

☐ Remember me on this computer

[ Log In ]

Forgot Your Password?

Login Page

FIG. 6

Contact Details

Unnamed <sonya@lyr.cs.brandeis.edu>

Name: Sonya Aronin
Address: sonya@lyr.cs.brandeis.edu sonya.nov@rfxtech.com 11:26:54
☐ Name-on-the-fly (sonya.nov.new@rfxtech.com)

Security Status
● Public
○ Protected
○ No sharing
○ Disabled

Exemptions
☐ Single address exempted from System
☐ The domain lyr.cs.brandeis.edu exempted from System Message Activity
12:20:57 Inbound to own unique; Subj: Advanced Footer
12:19:39 Inbound to own unique; Subj: Standard Footer
11:29:10 To this No Share address; used by sonya@lyr.cs.brandeis.edu View all history

[ Save ] [ Reset ]

Contact Details Page

FIG. 8

Options

User Properties

Your Name: [Sonya Aron]

E-mail Address: sonya@rfxtech.com (View properties)

Prefix: [Sonya]

Properties

Mode:  ● Enforce
       ○ Flag
       ○ Pass through
       ○ Reverse

Message Footer: ○ Standard
                ● Advanced
                ○ No footer ☑ Keep copies of reflected messages
☑ Append security codes to address
☐ Auto exempt on reply to flagged msgs

[Save] [Delete] [Reset]

|Contacts  |Options  |History  |Reflected  |Logout
|Password  |Reports

User Options Page

Administrator Add a Global Exemption Page

FIG. 11

ELECTRONIC MESSAGE ADDRESS ALIASING

RELATED APPLICATIONS

This application is a continuation of U.S. patent application Ser. No. 14/465,506 filed Aug. 21, 2014, which is a continuation of U.S. patent application Ser. No. 13/540,703 filed Jul. 3, 2012 (now U.S. Pat. No. 8,850,555), which is a continuation of U.S. patent application Ser. No. 12/909,351 filed Oct. 21, 2010 (now U.S. Pat. No. 8,239,471), which is a continuation of U.S. patent application Ser. No. 10/523,760 filed Jan. 30, 2006 (now U.S. Pat. No. 7,870,260), which is the U.S. national stage entry application of Int'l App. No. PCT/US03/25067 filed Aug. 11, 2003, which claims priority to U.S. Prov. Appl. No. 60/402,574 filed Aug. 9, 2002. The entire content of each of the foregoing applications is hereby incorporated by reference.

TECHNICAL FIELD OF THE INVENTION

The present invention is directed, in general, to computer networks and, more specifically, to a system and method for controlling access control over forms of electronic communications (e.g. "electronic mail", "instant messaging") where messages are directed between participants using sender and recipient identifiers.

BACKGROUND OF THE INVENTION

The great strength of electronic mail ("e-mail") is the universal use of standard protocols that define the content and delivery of e-mail messages. Unfortunately, these standard protocols do not authenticate sender identities, making access control over e-mail a difficult proposition. In recent years, the lack of access control over e-mail has led to dramatic increases in the volume of commercial and other undesired messages ("spam").

For over ten years, there have been hundreds of attempts to create a software system to control access to e-mail inboxes.

At the time of this application filing, it is a widely held belief that existing antispam technologies fail to solve the spam problem in e-mail, to the extent that there are predictions that spam has put the medium in jeopardy of becoming unusable.

The most common approach is what is collectively known as "spam filtering". Spam filters attempt to determine whether or not a message is desired based on an assessment of its content, the identity of the sender, or some other characteristic of the message.

Filters tend to suffer from one or several common deficiencies. Filters frequently miss spam messages and allow their delivery and also incorrectly identify legitimate messages as spam ("false positive"). Its problem enough to miss significant numbers of spam, but blocking legitimate messages is simply intolerable for most users, especially in business where the filtered message could be of critical importance.

Filters are easily bypassed since the properties on which filters depend to identify spam are frequently under the control of the sender (e.g. sender's identity, subject, message content).

Rules-based filters require ongoing maintenance of the rules by users and administrators. Filters can be computationally expensive, as each message much be processed through all of the rules leading to latency in message delivery.

A second approach to limiting access over electronic communications is to deny all access other than from authenticated sources, a technique typically known as "white listing". It's a system that allows messages to arrive "by invitation only".

When a message is sent to a white list-protected e-mail address, the message is delivered only if the sender's identity is found on the white list. Messages from senders not on the white list are rejected, quarantined as suspect spam, or most-commonly, challenged. Each rejection behavior introduces its own aggravation and disruption to legitimate communications.

White listing works because most spam senders do not want to receive reply messages, so message-based challenges mostly arrive to legitimate message senders only.

Changes to the underlying e-mail protocols will not bring relief. The IETF (the body that defines and supports the RFC e-mail standards) already defined an authentication extension to standard e-mail communications in 1999 called ESMTP. Yet even though ESMTP has been with us for four years, few if any mail hosts require the use of ESMTP by senders because to do so would be to deny the vast majority of messages sent with universal non-authenticated standard (SMTP). So no one will move to the ESMTP standard until everyone does, resulting in a continued and permanent dependency on SMTP.

Commercial schemes that try to put a monetary control system (e.g. pay-per message e-mail and bonded e-mail) over e-mail or that try to draw from legal intellectual property protection (e.g. trademarked poetry in message headers) require too much setup and follow-up aggravation to be acceptable to the majority of users.

The key insight that led to the present invention was accepting that it is very difficult, if not impossible, to design a system that separates all desired from undesired messages when mixed in a single collection. The numerous attempts that attempted to do so have not delivered complete protection against spam without blocking legitimate messages.

The solution resides in a system or method that can be adopted unilaterally by a user or enterprise that prevents desired and undesired messages from being mixed in the same collection.

SUMMARY OF THE INVENTION

A method for managing communications to a true address of a user in a communication network may include receiving an outbound communication from a communications infrastructure hosting the true address for the user, where the outbound communication is directed to one or more recipient addresses. According to the method, a server or similar intermediary may generate an alias address for each recipient address in an outbound communication so that each recipient may communicate with the true address using a unique reply channel. At the same time, a discrete security state may be assigned as a security attribute to each such alias address. The discrete security state, which can be controlled by the user and stored, e.g., at the intermediate server, establishes rules for controlling communications from one of the recipient addresses through the communications infrastructure to the true address via one of the alias addresses. Once an alias and a security state are assigned in this manner to facilitate handling of responsive communications, the outbound communication may be forwarded to recipient addresses through the communication network.

The present invention (the "product") provides systems, computer program products residing on computer readable medium (the computer readable medium does not include a transitory signal), and methods for controlling access in forms of electronic communications (e.g. "electronic mail", "instant messaging") where messages are directed between participants using sender and recipient identifiers, through the establishment and management of a plurality of proxy identifiers ("the proxies") that serve as substitutes to a protected original identifier ("the originator"), each of which proxies having a discrete security state defining access rights that correspond to the portion of the messaging community dependent on it for communications with the originator ("the contacts").

In every embodiment of the present invention, there are at least three security states, and in many embodiments many more than three, that control the manner in which proxy identifiers (e.g. e-mail addresses) are restrictive of access to the destination identifier during the delivery of messages, are created, and are substituted for references to the source identifier in the message.

In one embodiment of the present invention, the system supports multiple (i.e. more than three) security settings that collectively interact with each other, resulting in a matrix of discrete security states and corresponding behaviors. The diversity of security states in this embodiment provides system behavior that is more precise than, for example, a binary state system where access is either allowed or disallowed. In this and other embodiments, certain communities of users can be permitted access where others cannot, even in messages sent to the same destination identifier. For access control, messages can be denied, challenged, quarantined or accepted, and each with variations.

In one embodiment of the present invention, proxy e-mail addresses may be defined in a variety of manners, including automatic creation and assignment by the product as messages are processed through the system, explicit creation and assignment by the enterprise or individual user, and implicit creation following a naming convention that predetermines the source e-mail address and initial security state.

In one embodiment of the present invention, references to proxy e-mail addresses can be either translated or not translated to the corresponding source address, depending on the security state. For example, references to proxy identifiers that were created automatically by the product are replaced by the source identifier throughout the message. Explicitly created proxy addresses or defined via a naming convention (and are thus known to the user) are not replaced by the source identifier.

DESCRIPTION OF THE FIGURES

For a more complete understanding of the present invention, here is a brief description of the accompanying figures.

FIG. 5 is a table of formulas that describe the various address translation results depending on the context of messages (i.e. who is sending the message, using what proxy, and to whom) and various security settings.

FIG. 6 Login Page.

FIG. 8 Contact Details Page.

FIG. 9 User Options Page.

Figure 10:
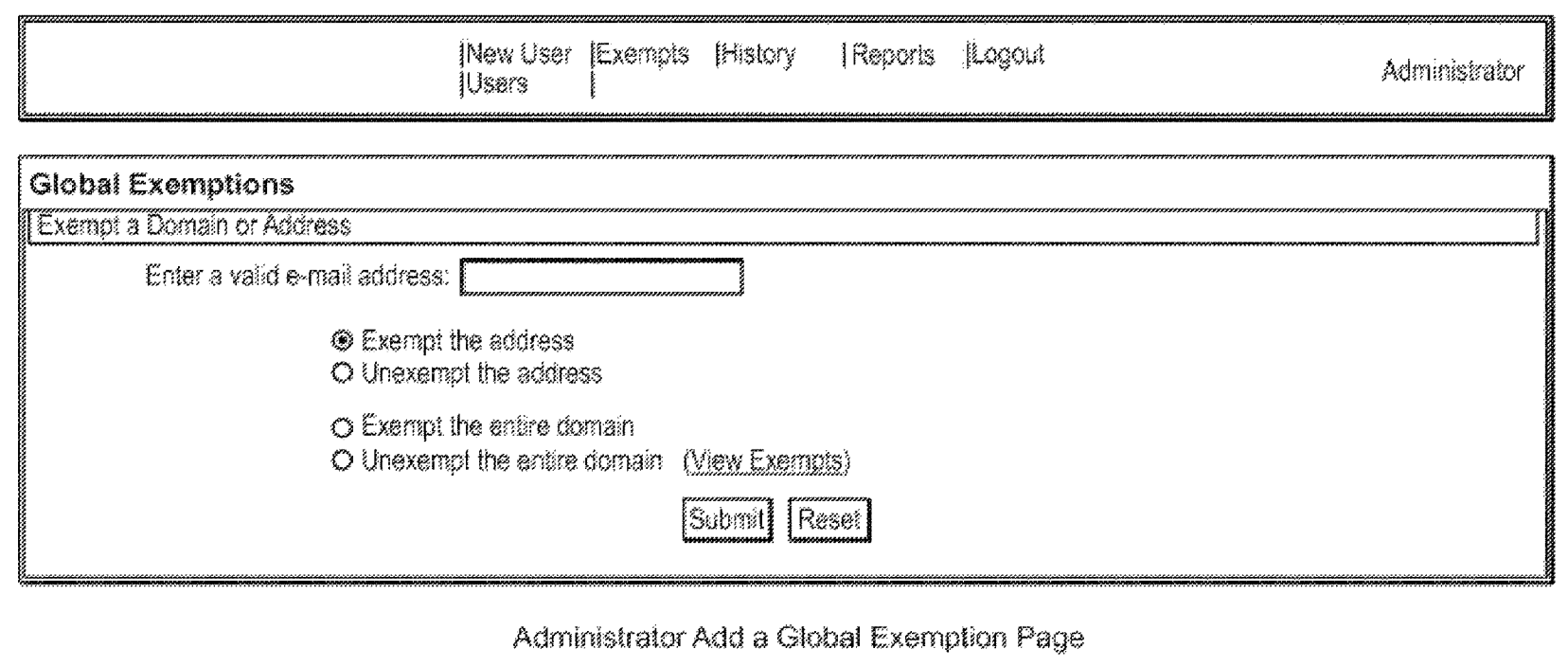

FIG. 10 Administrator Add a Global Exemption Page.

Figure 11:
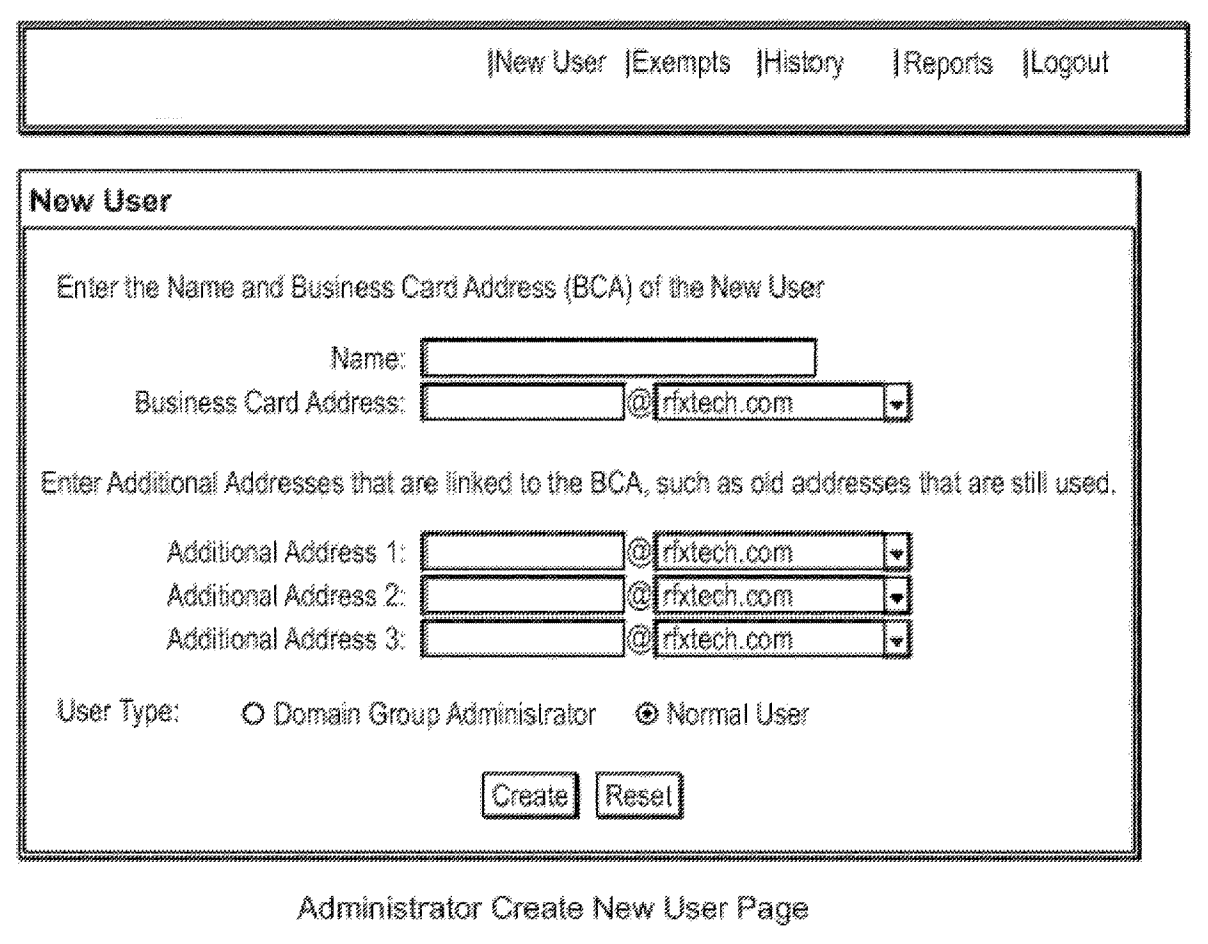

FIG. 11 Administrator Create New User Page.

DETAILED DESCRIPTION

Figure 1:
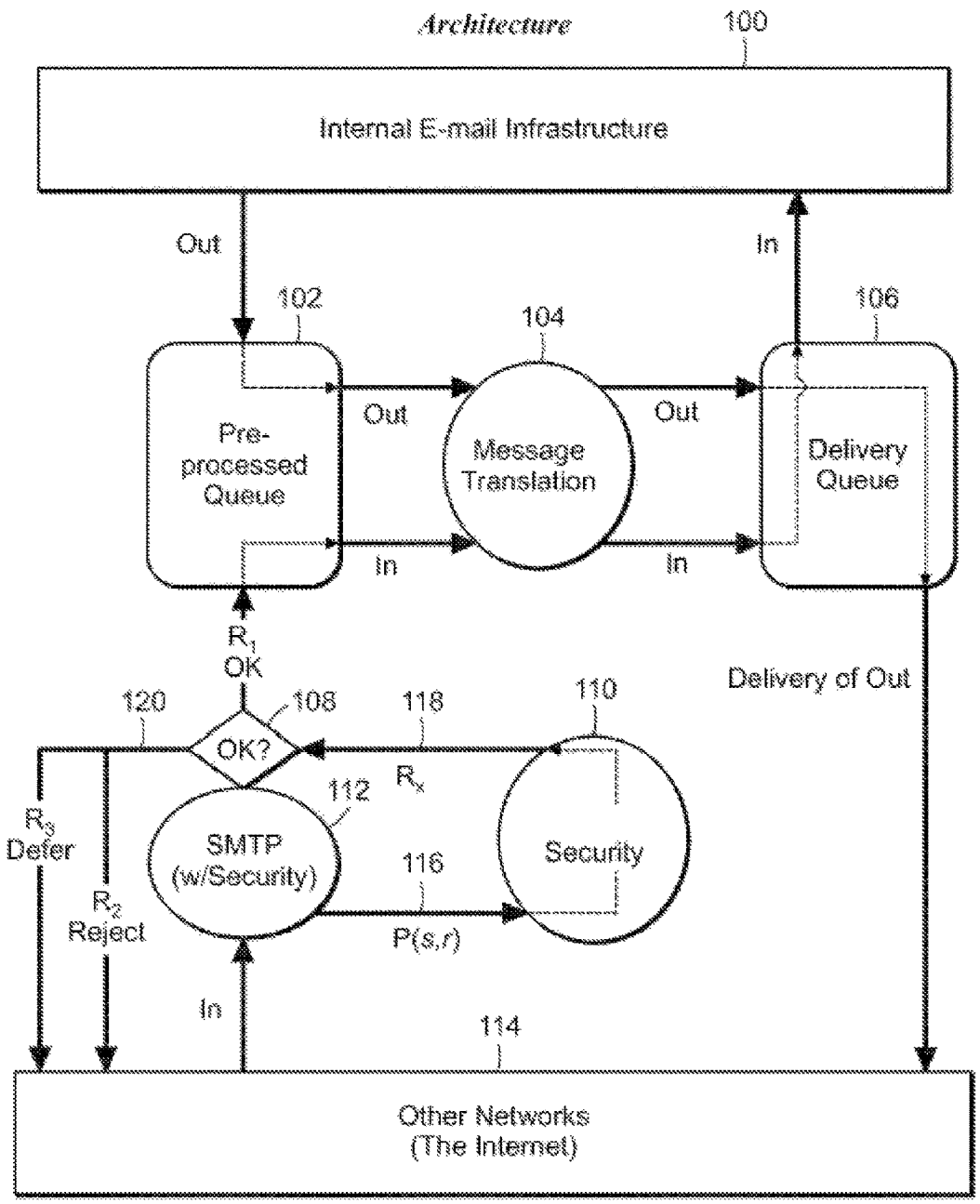
FIG. 1 illustrates a high-level block diagram of the architecture of the preferred embodiment of the present invention.

The product is comprised of three systems:
1. Mail Server (MS)
2. The Administration Web Site (AWS)
3. Database server The three systems can reside on a single server or be clustered in a variety of configurations on multiple servers.

About the Mail Server

It is a requirement of the invention that all external messages to and from the originator pass through the product. Messages from the originator to an external recipient ("contact") are herein called "outbound messages"; messages from an external sender (also a "contact") to the originator are herein called "inbound messages".

The Mail Server ("MS") employs two storage queues, one in which in-bound traffic messages reside until the Security Module processes them (the "pre processed queue"), and a second wherein processed messages and bounce messages are placed for final delivery (the "delivery queue").

The sender and recipient e-mail addresses specified in the transport envelope of the SMTP delivery are the keys for the Security Module. The Security Module determines, based on a combination of interacting security states as defined hereinafter, whether or not the message should be delivered to the intended recipient.

A variety of error messages and warnings can be sent back to the sender if warranted.

Messages that are delivered typically have a footer attached to the bottom of the message by the MS with a link to the "Wizard," a polymorphic browser interface that serves as the user's primary interface to the product.

The Mail Server also manages the creation and use of the arrays of proxy identifiers that is the core security apparatus of the invention.

Proxy Addresses

Each contact is assigned one or more proxy addresses, each of which is a RFCcompliant email addresses (i.e. addresses compatible with the naming conventions of the most common e-mail protocols, see The Internet Engineering Task Force for more information on e-mail protocols). In the context of this application, "proxy identifier" is synonymous with "proxy address".

Each contact is assigned its own proxy address on first reference as either the sender or recipient in a message passing through the MS. The product controls access to the infrastructure based on enterprise and user preferences and defaults, stored as properties on each security code.

Following a message from an originator to an external contact:

1. An outbound message is processed through the existing e-mail infrastructure of the host enterprise and arrives at the product embodying the invention.

2. The product automatically assigns and records a unique proxy address as being registered for use by the contact. If a proxy address had previously been assigned to the contact, it will be reused.

3. All references to the originator's address in the header and body of the outbound message are changed to corresponding proxy address. For example, a message from the originator address: From: ssmith@company.com is sent to an outside contact. As the message passes through the product, all references to the originator address ssmith@company.com are changed to the proxy address that corresponds to the recipient, which in this example is: From: ssmith.123@company.com When the message arrives in the contact's inbox, the message appears to have originated from the address ssmith.123@company.com (emphasis on the ".123"), not from ssmith@company.com.

In this example, the proxy address remains personalized to the originator's identity; the local part still has "ssmith" and the domain remains "company.com". In other embodiments, the proxy address could just as easily sustain no visible provenance from the originator address.

4. After altering references of the originator address to be the proxy address, the message is delivered as with any unaffected e-mail message.

Following a message sent from an external contact back to the originator via a proxy address:

1. An outbound message is sent to the proxy address by an external contact that ultimately arrives at the MS.

2. The MS Security Module determines the delivery disposition for the message based on the security state of the addresses involved, including but not limited to:

a. Message delivery denied, message offering no recourse to sender. End processing.

b. Message delivery denied, message offering new proxy to sender. End processing.

c. Message delivery accepted, message flagged as "suspect". Proceed to 3.

d. Message delivery accepted without reservation. Proceed to 3.

3. For messages authorized for delivery, all references to proxy addresses in the header and body of the inbound message are changed to corresponding originator's address. To continue the example, a message to the proxy address: To: ssmith.123@company.com When the message arrives in the contact's inbox, the message appears to have been sent from the external contact to the originator's address ssmith@company.com.

In this manner, proxy addresses on inbound messages are not exposed in the final delivery, making the mechanics of the access control protocol transparent to the user.

Users can disable or restrict the use of one security code without affecting any other.

Access control is difficult to circumvent because the security settings reside on the e-mail address itself, so it doesn't matter who the sender says that they are, or what they place in the message, the address itself will no longer work once disabled.

About the Administration Web Site

The Administration Web Site ("AWS") provides a full-control, full-disclosure interface to the proxy arrays, security settings and traffic history.

The A WS is built on a three-tier architecture:

1. Java Server Pages and Servlets
2. Database Server
3. Application Server

The server pages define the application interface, update and request data from the Database Server, and construct result pages and forms that are served to the user's browser by the Application Server.

Within the interface defined in the server pages and servlets, there are a number of application-specific objects.

Users

Access to the overall A WS requires success authentication of the user's credentials. In the preferred embodiment, the A WS requires a successful login using a user ID and corresponding password.

Authentication and credential requirements are enforced on every page within the AWS.

There are three levels of users supported in the A WS, each having different access privileges:

1. Super Administrator—full access and the only user type that can access the server configuration and control methods. Access to overall traffic history details and summary.

2. Domain Group Administrator (DGA)—full access to the domain group itself, the users of the domain group, and the traffic history for domain group to which the DGA is assigned.

3. User—Access to the user's own options, proxy addresses and personal history.

| Property | Description |
| --- | --- |
| Login ID | Name or e-mail address used during login to the Administration Web Site |
| Password Mode | Password used during login to the Administration Mode Web Site<br>The system has different overall security modes by user:<br>1. Enforce - Denial and challenge messages are sent to senders when their messages cannot be delivered<br>2. Flag - Guarantees that all messages are delivered to the recipient. Messages that would be denied or challenged in Enforce Mode are instead "flagged" (i.e. given a visible indicator that the message would not have been delivered in Enforce Mode.<br>3. Pass Through - Messages to the recipient are to skip the Security Module altogether and go straight to delivery.<br>4. Reverse - Used to eliminate the dependency on proxy addresses, ostensibly in preparation for removal of the product. All security is dropped, and any message to a proxy address results in a request message being sent to the sender requesting that future messages to the recipient be sent on the original address. Messages are flagged on messages sent to a proxy address. |
| Footer | As messages pass through the product, the MS attaches a footer to the bottom of each message. There are three types of footers available to each user:<br>1. Standard Footer - Contains single link that connects to the Wizard.<br>2. Advanced Footer - Contains a great deal of additional information and links not found in the Standard Footer.<br>3. No Footer - The Footer is not required; this type turns it off. |
| Message Store | Option to keep copies of messages that denied or challenged. |
| Auto-Exempt | Option to automatically exempt contacts when the user replies to a flagged message from the contact. |

The Server

The Server object contains properties and methods that are specific to the entire installation of the product. The server object is available only to users with "super administrator" privileges.

Most of the properties are related to the behavior of the product as a generic mail server. These include settings for the queue life time, IP address of the Administration Web Site, database backup schedules, etc.

Domain Groups

Each system installation can support any number of enterprises. Enterprises are managed as a Domain Group on the product. A Domain Group can have any number of domains under management, any number of users with addresses at these domains, and any number of Domain Group Administrators (DGAs) managing the Domain Group.

Contacts

The system catalogs all of the external contacts that either sent or received a message to or from the user. A contact is both a proxy address with security settings and a security profile of the contact to which it is registered.

| Property | Description |
| --- | --- |
| Contact Name | Name of the contact to which this contact's proxy address is registered. The Contact Name is parsed from inbound messages from the contact. |
| True Address | The contact's e-mail address (not to be confused with the proxy address assigned to the user). |
| Proxy Address | The system proxy address assigned to the Security Status contact by the MS. |
| Security Status | Each proxy address has one of the following security status:<br>1. Public - This proxy can be used and shared by anyone and messages to it will be delivered.<br>2. Protected - Only "appropriate" contacts can use this proxy address, inappropriate contacts will be challenged (Enforce Mode) or their messages will be flagged (Flag Mode).<br>3. No Share - Only "appropriate" contacts can use this proxy address, inappropriate contacts will be denied (Enforce Mode) or their messages will be flagged (Flag Mode).<br>4. Disabled - No mail to this proxy address will be delivered (other than for exempt senders). |
| Message Store | Option to keep copies of messages that denied or challenged. |
| Auto-Exempt | Option to automatically exempt contacts when the user replies to a flagged message from the contact. |
| Name-on-the-Fly (NOTF) | If enabled, allows new proxy addresses to be defined "on the fly" (i.e. without any interaction with the product) that are derivatives of this contact's proxy address. For example, if the proxy address of this contact is:<br>proxy@company.com<br>and NOTF is on, then the user can invent any new proxy address of the form:<br>proxy.new@company.com<br>where "new" is anything that the user wants. The NOTF proxy will be assigned to the first contact that uses it. |
| Life Span | Proxy addresses can be assigned a limited life span. When a proxy "expires", the security state is set to disabled. |

Exemptions

The system supports exemptions.

History

The product records descriptive information about each message that is sent in or out of the enterprise. The individual message history items are consolidated into totals for historical summary reporting and dropped after remaining online for a configurable length of time.

FIG. 1—Architecture for the Preferred Embodiment

The following is a legend corresponding to elements illustrated in FIG. 1:

Legend: s=sender identity
r=recipient identity
P(s,r)=Request security status on a message from s to r
$R_x$=Security status on a message from s to r
$R_i$=OK, continue processing message
$R_2$=Reject. Do not process the message
$R_3$=Defer, temporarily defer the message back to the sending server The Mail Server employs 2 e-mail queues, one queue for in-bound traffic wherein messages reside until the Security Module processes them (the "preprocessed queue") 102, and a second queue wherein processed messages and bounce messages are placed for final delivery (the "delivery queue") 106.

Inbound messages (from either the mail server of the enterprise 100 or the mail server of the external contact 114) are received and stored in the inbound queue 102. Inbound messages from external sources 114 are subject to the product's security.

Security enforcement takes place during receipt of the inbound messages using the SMTP protocol 112. As soon as the transport envelope sender and recipient addresses are received, the SMTP protocol handler sends a request to the Security Module 110 to obtain the security disposition for this message 116. Subsequent processing of the remainder of the incoming message is predicated on the security response 118 returned from the Security module 108.

If the message can be delivered, it is deposited into the pre-processing queue 102. If the message cannot be delivered, either a deferral or denial 120 will be sent back to the sending server 114.

Messages that are subject to deferral are only deferred for some amount of time (typically 30 to 60 minutes). This is a test that the sending server 114 is "well-behaved". Many servers that send spam do not process deferred messages, thus deferred messages will not be resent from such sources.

Using a typical queue scheduler, each inbound message is processed by the product's Message Translation module 104, which deposits into the delivery queue 106 either:
  the message "as is", or
  the message with some level of additions, modifications or other translation, to be described hereinafter The delivery queue 106 will deliver inbound messages to the internal e-mail infrastructure 100 of the enterprise or to an external destination 114. The delivery queue can use standard destination lookup mechanisms to resolve delivery locations (such as Domain Name Service DNS) or a routing table that sends mail to known internal domains to the internal e-mail infrastructure 100 and everything else to the Internet 114.

Figure 2:
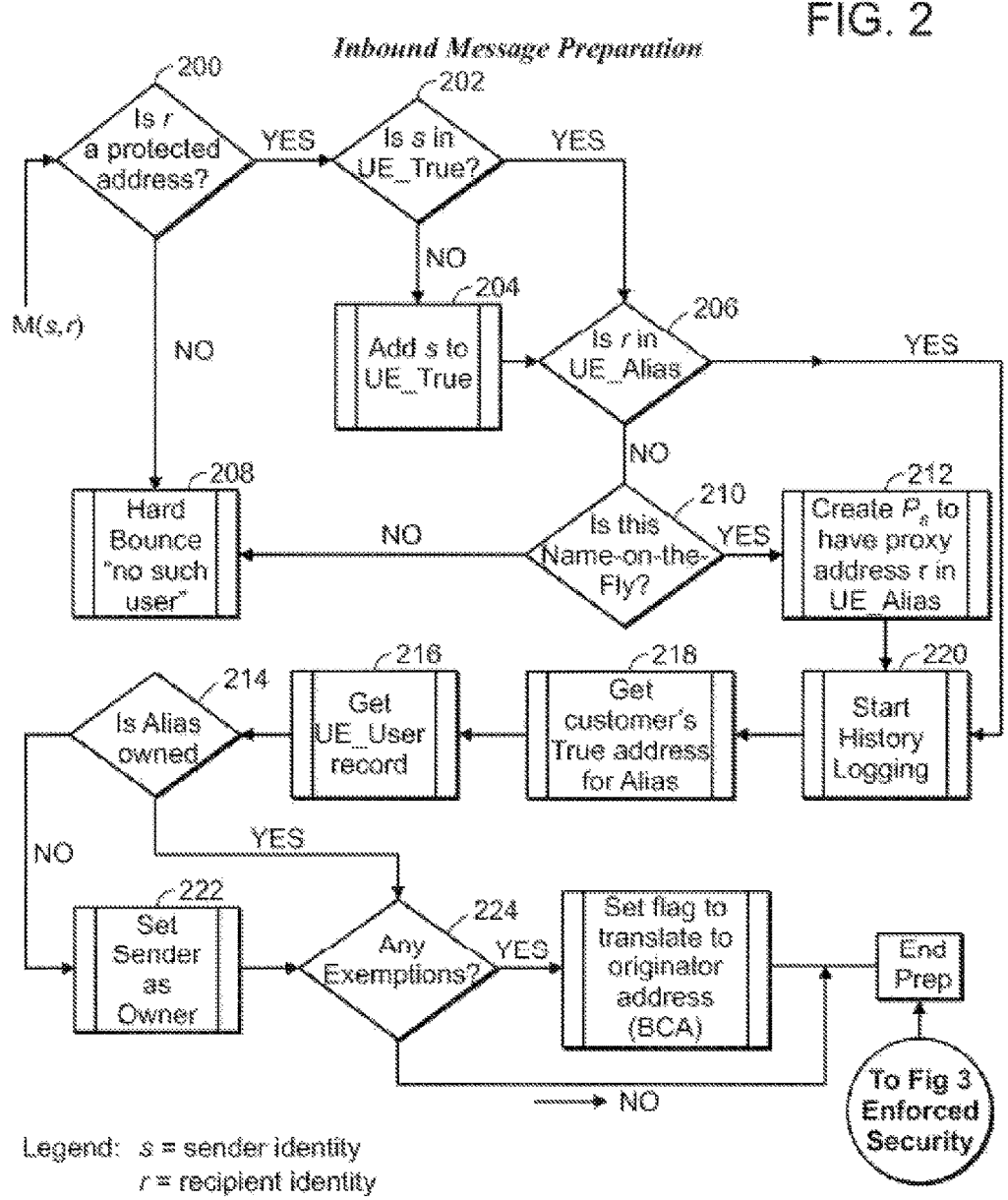
FIG. 2 is a flowchart diagram that illustrates how the database is populated from e-mail traffic and other preliminary steps followed in the preferred embodiment prior to enforcement of the security module.

FIG. 2—Inbound Message Preparation

The following is a legend corresponding to elements illustrated in FIG. 2:

Legend: s=sender identity
r=recipient identity
M(s,r)=A message from s to r
UE_TRUE is a database table containing "real" (i.e. non-proxy) addresses
UE_ALIAS is a database table containing proxy addresses
UE_User is a database table containing user information
BCA="Business Card Address", the originator address managed by the internal mail transport agent (i.e. mail server)
$P_s$ is the security settings for the proxy address registered to s for user that owns originator address to which proxy r is a substitute As the product processes mail, it updates the database with new proxy addresses, volume statistics and historical tracking FIG. 2 details the database preparations that are made during the receipt of an inbound message in the preferred embodiment.

Inbound message preparation takes place before the security disposition is returned on a given message.

The first thing that is examined on an incoming message is whether or not the recipient address is at a domain that is being protected by the system 200.

It is important to note that a message that arrives at the system must either be sent to an address whose domain is being protected by the system ("inbound"), or be sent from such an address ("outbound"). Local mail should be delivered locally; therefore the system should never see e. mail to and from addresses at the same domain.

It is possible for mail to be sent from one enterprise to another and have both enterprises' domains be hosted on a single system installation. In this case, the message is first processed as an outbound message from the first enterprise and then is treated as an inbound message to the second enterprise.

If the sender's address has never been encountered by this installation of the system 202, it is added to the database table of "true addresses" 204.

Next, the product searches the database to see if the recipient address is an issued proxy address 206.

If the alias does not exist, it is still possible that the address was created through the naming convention known as, "Name-on-the-Fly" (NOTF) 210, in which case the proxy address should be created and registered to the protected user based on information drawn from the naming convention 212. If NOTF is not permitted for the unknown proxy address, the message is rejected 208.

At this point, the proxy address exists in the database. Start tracking the result of the message for the history system 220.

To find the user for which the proxy serves as a substitute, it's necessary in the preferred embodiment to navigate first to the user's original address 218 then from there to the user records 216. In other embodiments, this can be accomplished using numerous other strategies, however, it is necessary to have in hand the identity of the user in order to proceed.

If the proxy address is unregistered to any given user 214, then register it to the current sender 222. This condition can occur due to two possible conditions. First, the proxy address was just created using NOTF, and is thus un-owned. Second, proxy addresses can be explicitly created prior to being used, in which case it is un-owned until the first use, and wherein it becomes registered to the first user 222 just as with NOTF proxies.

The sender's exemption status is then checked 224 to provide information to the Security Module and also the Address Translation Module. Exempt senders are not subject to access control and all mail to and from exempt contacts are conducted under the original internal address of the protected user.

Figure 3:
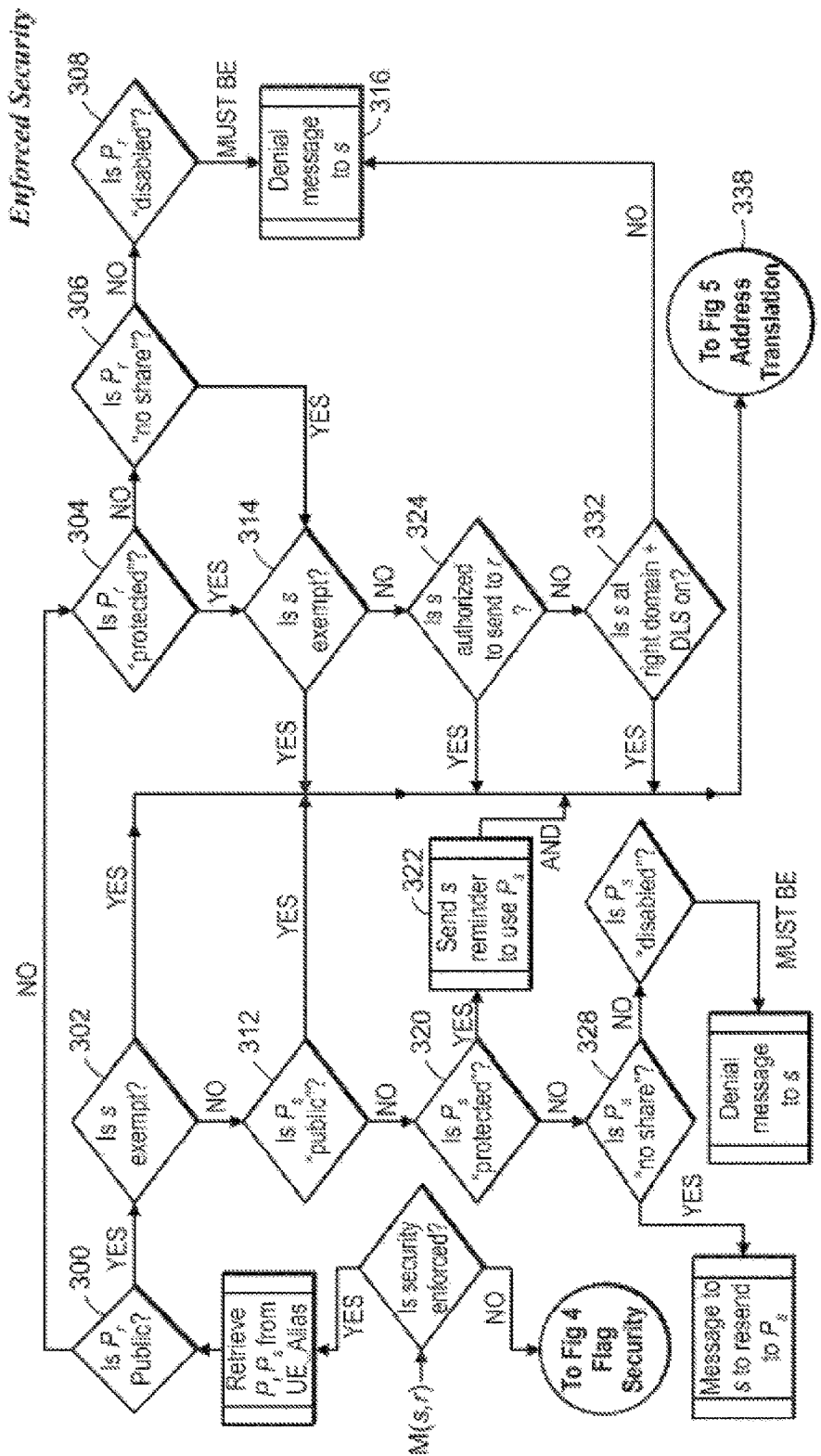
FIG. 3 is a flowchart diagram that illustrates the logic and behavior of the Security Module of the preferred embodiment when the product is operated in Enforce Mode.

FIG. 3—Enforced Security

The following is a legend corresponding to elements illustrated in FIG. 3:

| | |
|---|---|
| Legend: s = sender identity | M(s,r) = A message from s to r |
| r = recipient identity | UE_Alias a database table containing proxy addresses |
| $P_s$ is the security settings for the proxy address registered to s for user that owns proxy r | DLS stands for Domain Level Sharing |
| $P_r$ is the security settings for the proxy address r | Note: It is possible for $P_s$ to be the same object as $P_r$ |

Once inbound message preparation is completed, the system will determine the security disposition for this message.

There are two active security modes available to system users; Enforced Mode and Flag Mode.

FIG. 3 details the logic followed by the preferred embodiment security model for messages sent to a user that employs Enforced Mode.

By definition, all inbound mail to domains protected by the system are proxy identifiers, even if the recipient address is indistinguishable from the original, internal address. Each original, internal address has a proxy address with the same address in order to permit security to be placed on the original address itself.

The security state of the recipient address is interrogated first.

Message to a Public Proxy

If the recipient proxy address has a security status of "public" 300, then check for the sender's exempt status 302. If the sender is exempt, security is bypassed and the message is passed on to subsequent message translation stages and delivered 338.

If the proxy address that is registered to the sender is not the same as the proxy address used as the recipient address for this message (this is not stated clearly in the figure, but is the case), the product will examine the security set on the proxy of the sender before permitting delivery.

If the proxy assigned to the sender is public 312 or protected 320, the message is allowed through security 338. The sender is sent a reminder message to use their own proxy address in the future 322 if the proxy that is registered to them is protected.

If the sender's proxy is "no share" 328, the message is not allowed to be delivered. Instead, the sender is sent back a request that the sender resend the message using the proxy address registered to the sender (as opposed to proxy used as the recipient in this message).

So even if a message is sent to public proxy address, the security state of the sender's proxy address can alter, or prohibit, the delivery of the message.

Message to a Protected Proxy

If the recipient proxy address has a security status of "protected" 304, then check to see if the sender is permitted to send mail to this proxy address.

Currently, there are three ways that a sender can be authorized to use a protected proxy. First, if the sender is exempt 314 then security is bypassed and the message is passed on to subsequent message translation stages and delivered 338. Second, if the sender is the party that is registered to the proxy address 324, delivery is authorized and completed 338. Finally, if the sender is from the same domain as the contact that is registered to the proxy address and the domain is not one of the major ISPs such as AOL, Yahoo, Hotmail, etc. (a configurable list), and the security property that permits domain-level sharing is enabled on the proxy 332, the message is authorized for delivery 338.

Senders that are not authorized to use a protected proxy are sent a request that the message be resent to the proxy address that is permitted for use by the sender 316. This message essentially states that "proxy address x has been changed to the sender's proxy address y. Please resend your message to y".

Protected addresses are used to protect against spam that has no valid return address, but to afford legitimate contacts a resend mechanism that will let messages be delivered.

Message to a No Share Proxy

If the recipient proxy address has a security status of "no share" 306, then check to see if the sender is permitted to send mail to this proxy address.

Currently, there are three ways that a sender can be authorized to use a protected proxy. First, if the sender is exempt 314 then security is bypassed and the message is passed on to subsequent message translation stages and delivered 338. Second, if the sender is the party that is registered to the proxy address 324, delivery is authorized and completed 338. Finally, if the sender is from the same domain as the contact that is registered to the proxy address and the domain is not one of the major ISPs such as AOL, Yahoo, Hotmail, etc. (a configurable list), and the security property that permits domain-level sharing is enabled on the proxy 332, the message is authorized for delivery 338.

Senders that are not authorized to use a protected proxy are sent a denial of delivery message that gives no recourse for resending the message. 316. The difference between unauthorized use of a protected address versus unauthorized use of a no share address is that protected proxy denials provide a means for successfully resending the message while no share denials do not.

With no share proxies, the requirement to successfully send an e-mail message is raised from simply knowing the recipient address to knowing both the recipient and the corresponding sender address that is registered to the proxy. No share proxies provide security-conscious organizations a very effective yet lightweight protection against what are known as "directory harvest attacks". Directory harvest attacks are a technique used to gather live e-mail addresses by sending messages to large numbers of different addresses at the targeted domain. Whatever addresses do not result in a "no such user" are assumed to be valid.

With no share proxies, directly harvests will fail unless the sender knows to spoof the correct sender's address in each attempt.

Message to a Disabled Proxy

If the recipient proxy address has a security status of "disabled" 308, then check to see if the sender is exempt, for that is the only way that a message to a disabled proxy can be delivered if the user employs Enforce Mode security.

Figure 4:
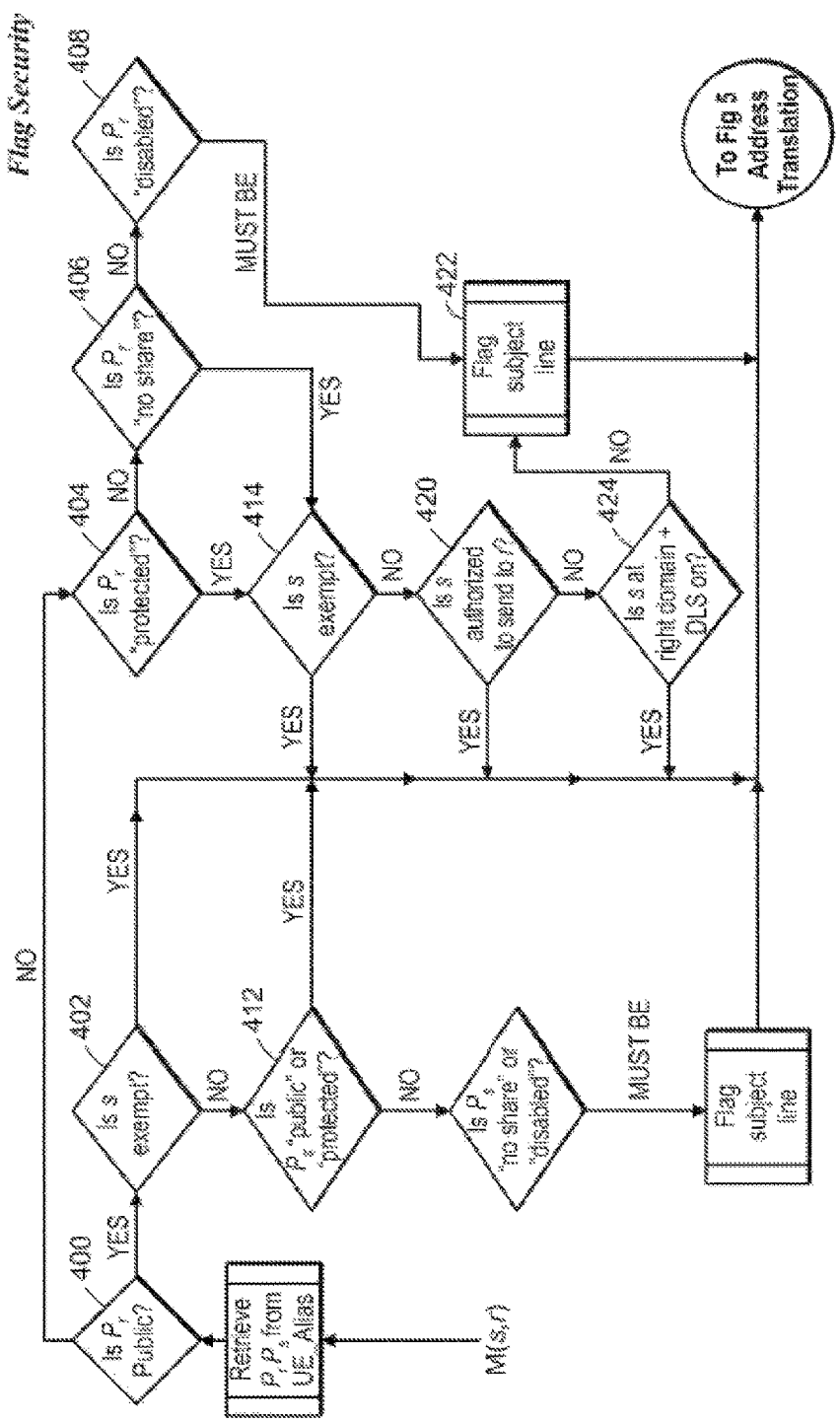
FIG. 4 is a flowchart diagram that illustrates the logic and behavior of the Security Module of the preferred embodiment when the product is operated in Flag Mode.
Figure 7:
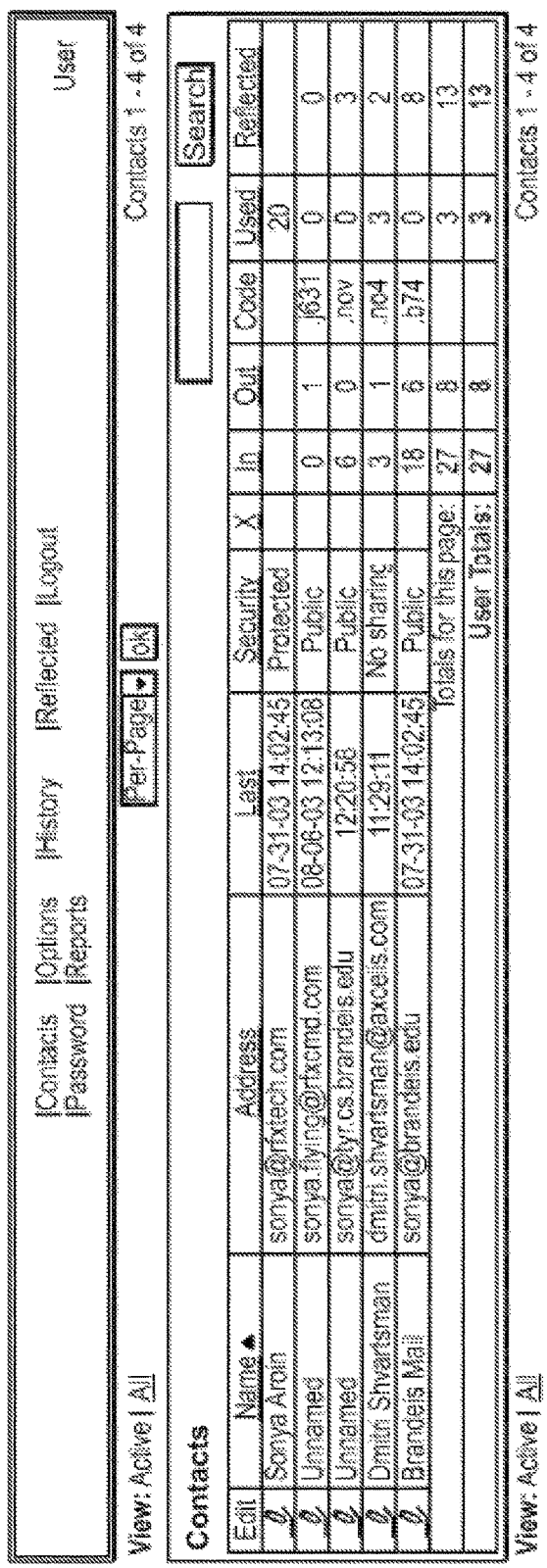
FIG. 7 Contacts List.

FIG. 4—Flag Security

The following is a legend corresponding to elements illustrated in FIG. 4:

| Legend: | s = sender identity | M(s,r) = A message from s to r |
|---|---|---|
| | r = recipient identity | UE_Alias a database table |
| | $P_s$ is the security settings for the proxy address registered to s for user that owns proxy r | containing proxy addresses DLS stands for Domain Level Sharing |
| | $P_r$ is the security settings for the proxy address r | Note: It is possible for $P_s$ to be the same object as $P_r$. |

FIG. 4 details the logic followed by the preferred embodiment security model for messages sent to a user that employs Flag Mode.

Flag Mode guarantees that all inbound messages will be delivered to the user's in box.

The logic is almost the same as described for FIG. 3, the only material difference is that, in Flag Mode, whenever a sender is determined to be unauthorized to send a message to the recipient proxy, instead of sending a denial or retry message as would occur in Enforce Mode, the product will only flag the subject line with a prefix to indicate that the sender is unauthorized to send this message to the chosen proxy address 422/426.

It's important to note that the subject line flag is visible only inside the host enterprise; the system removes the flag on replies to flagged messages on the way out of the enterprise.

Flag Mode serves three important product requirements:

1. Provides new users with a mode of operation for a smooth migration into using the system, guaranteeing that no outside contact will ever be aggravated by the system ("transition"). Pre-existing spam problems are cleared up in the new user's transition period.

2. Provides users with little or no tolerance for the blocking of legitimate but unexpected messages a guarantee that all mail will be delivered to the user's inbox. Flag Mode is ideal for those in the role of sales, business development or executive positions where a lot of business cards are handed out and the value and frequency of unexpected messages is high.

3. Users that do not or cannot change their e-mail behavior will operate the product permanently in Flag Mode. These users (or their administrator) can also inhibit the use of proxy addresses altogether, allowing the user to continue to use their one and only address as normal, yet still receiving spam relief.

How to Stop a Pre-Existing Spam Problem

A new user that begins using the product, who has a pre-existing spam problem, can end spam being sent to the existing address in the following manner:

1. Configure overall security enforcement to Flag Mode.

2. Exempt all known contacts using any of the various embodiments of exemption methods. Exempting contacts allows legitimate contacts that are already dependent on the original, internal address to continue to use it unabated.

3. Increase security on the proxy that has the same address as the original, internal address. This will cause any mail sent to that proxy to be flagged unless the contact is on the exempt list. This is a non-aggressive form of "white listing", a common technique that is very effective at blocking spam but which has shortcomings that limit wide scale adoption, particularly among businesses. The system only employs this white list to stop a pre-existing spam problem. If a new user does not start with a spam problem, the white list is not required.

FIG. 5—Address Translations

Once an inbound message has been successfully cleared for delivery, most references to proxy addresses are translated to the corresponding original, internal addresses. There are some security states in the preferred embodiment that inhibit the translation of proxy addresses, specifically Name-on-the-Fly proxies.

NOTF proxies were defined by the user and, as such, reside in the name space of the user. Many times, NOTF proxy addresses are used in a login sequence or other process keyed by the NOTF proxy address. By inhibiting the translation of the NOTF within the body of an e-mail message (as opposed to the header of the message, which must be translated to ensure delivery of the message within the existing e-mail infrastructure), confirmation messages that specify the use of the NOTF proxy will be accurate (i.e. translation would make the information inaccurate).

When considering address translations, first understand that only proxy addresses at the domains protected by the individual system installation are candidates for translation. Addresses at non-protected domains are never translated.

The system keeps a catalog of "true" addresses within the database. Both external addresses and internal, original addresses of the protected domains are stored in the true address catalog 500. Proxy addresses are found by seeking the proxy address itself as a key (e.g. proxy.123@company.com) or by seeking a proxy that is assigned to an outside contact for use a substitute to an internal, original address 502.

Given the true addresses of the sender and receiver, the corresponding proxy can be retrieved on outbound messages and substituted within the message for any and all references to the original, internal address.

Given the proxy address, the corresponding internal, original address can be retrieved on inbound messages and substituted within the message for any and all references to the proxy address.

Address translation becomes more complicated when the product also translates, for both inbound and outbound messages, proxy addresses of colleagues that may or may not exist, but which are created if necessary.

Exemption status adds another level of complexity, as e-mail to and from exempt contacts result in address translations being inhibited.

Additionally, some external contacts are dependent on a third-party proxy, so messages to those contacts should preserve the continuity of use of the proxy that is expected (i.e. the same proxy is presented to the same contact in all messages from the user to that contact).

To understand FIG. 5, it is very important to become comfortable with the syntax.

Read 504 as. "a translation method that takes some address 'a' and returns the correct translation for it".

Read 506 as, "a method that returns the proxy address that the outside contact expects to see", which is not always the same as the proxy addressed assigned to the contact.

Benefits of the Invention

The primary benefit of the invention is that undesired messages can be prevented, with great precision, from being delivered to identifiers that are protected by the system.

Since the system does not filter e-mail, physical bandwidth can be saved (and the associated costs) when the system rejects messages during SMTP receipt of inbound traffic.

Also, the system does not suffer from "false positives". The security model is consistent and always under the control of the user or host enterprise.

The system also saves money on the archiving of e-mail, since there is less spam to store.

The system can reveal things that occur in electronic communications but which are difficult to see. For example, in e-mail, the system detects the sharing of an e-mail address between parties, and can also detect when someone is authoring mail using a corporate e-mail address without sending the message out through the corporation's infrastructure (thus bypassing whatever security and controls are in place).

Figure 12:
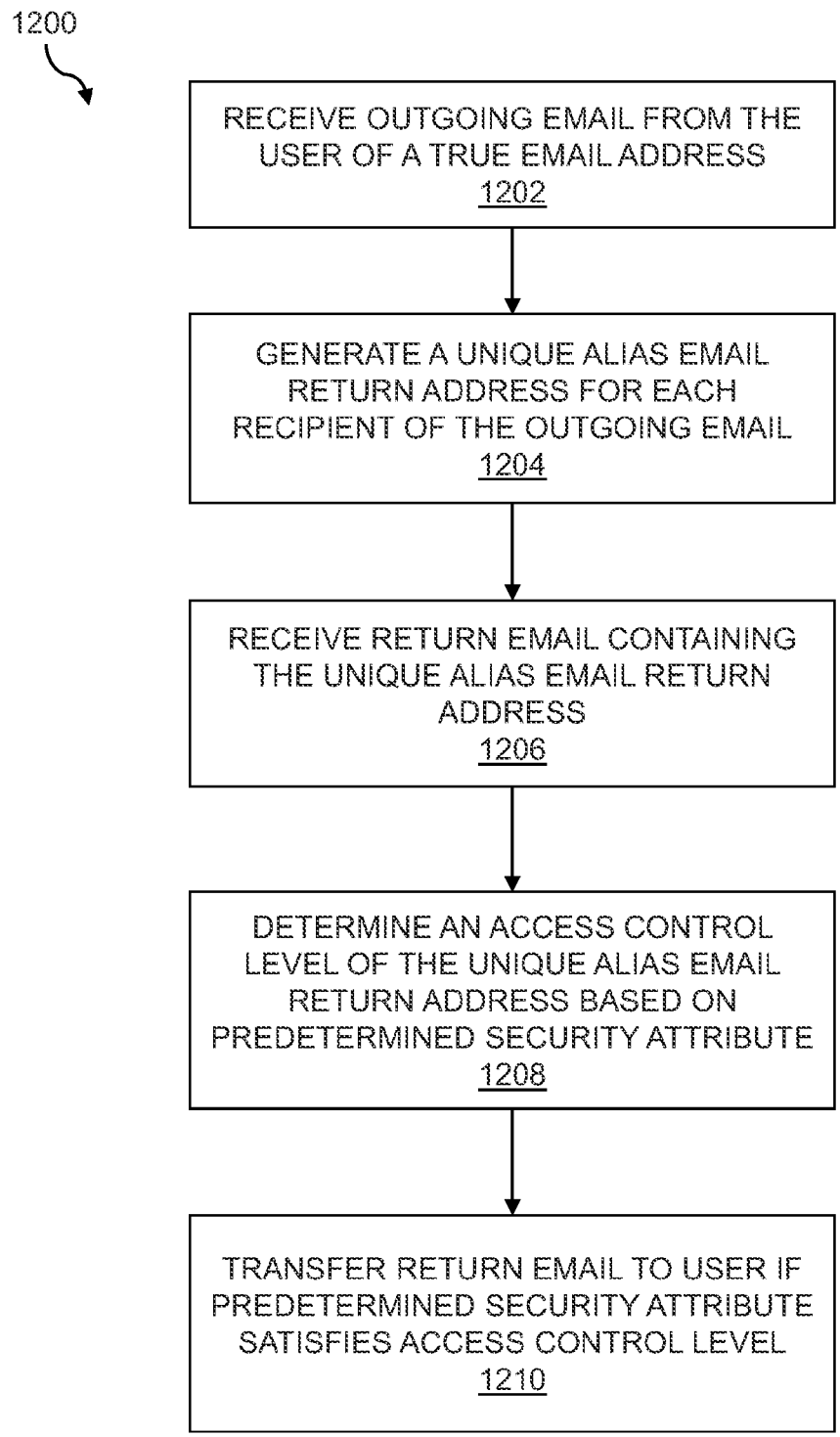
FIG. 12 is a flow chart illustrating a method for controlling access to a true email address.

FIG. 12 is a flow chart illustrating a method for controlling access to a true email address.

As shown in step 1202, the method 1200 may include receiving an outgoing email from the user of the true email address.

As shown in step 1204, the method 1200 may include generating a unique alias email return address for each recipient of the outgoing email.

As shown in step 1206, the method 1200 may include receiving a return email containing the unique alias email return address.

As shown in step 1208, the method 1200 may include determining an access control level of the unique alias email return address based on a predetermined security attribute of the unique alias email return address.

As shown in step 1210, the method 1200 may include transferring the return email to the user if the predetermined security attribute satisfies the access control level. The predetermined security attribute may be altered at any time by the user.

Figure 13:
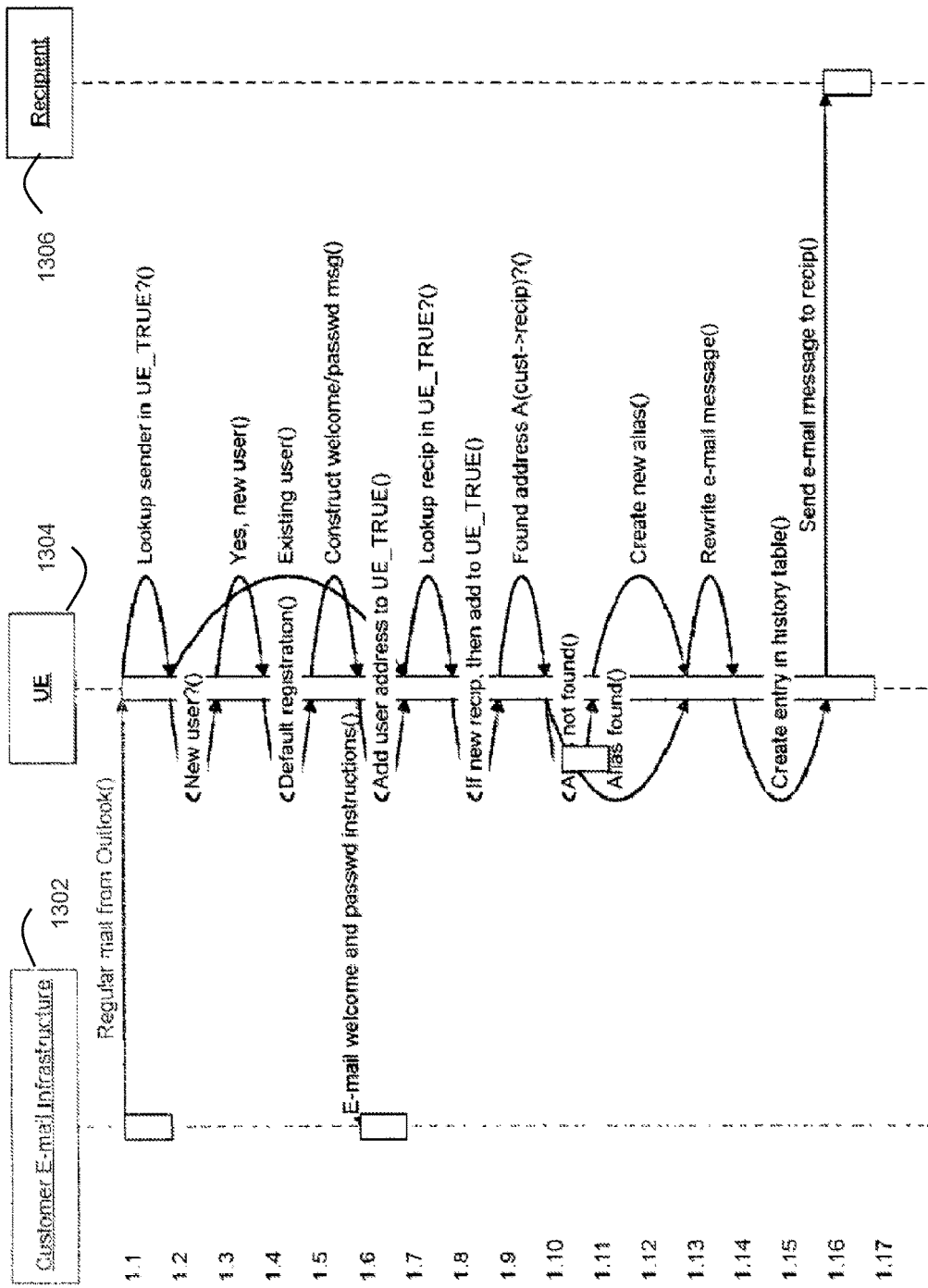
FIG. 13 illustrates an example of a user sending a message from a hosted e-mail infrastructure through an intermediate server to a recipient.

FIG. 13 illustrates an example of a user sending a message from a hosted e-mail infrastructure 1302 through an intermediate server 1304 to a recipient 1306. As shown in FIG. 13, a first step may include sending regular mail from an e-mail system. The intermediate server 1304 (abbreviated in the figure as "UE", derived from an early description of the product as "Unlisted E-mail") may lookup the sender in a UE directory, e.g., to identify the sender as a new or existing user. If the sender is a new user, the system may proceed to a default registration process where the intermediate server 1304 constructs a welcome/password message to the new user, and e-mails welcome and password instructions back to the user in the hosted e-mail infrastructure 1302. The system eventually proceeds to lookup the recipient. If the recipient is new, they may be added to the system. If an alias for the recipient is found, the system will rewrite the email message using the alias. If no alias is found, a new alias for the recipient may be created. An entry in a history table may be created before eventually sending the email message to the recipient.

Figure 14:
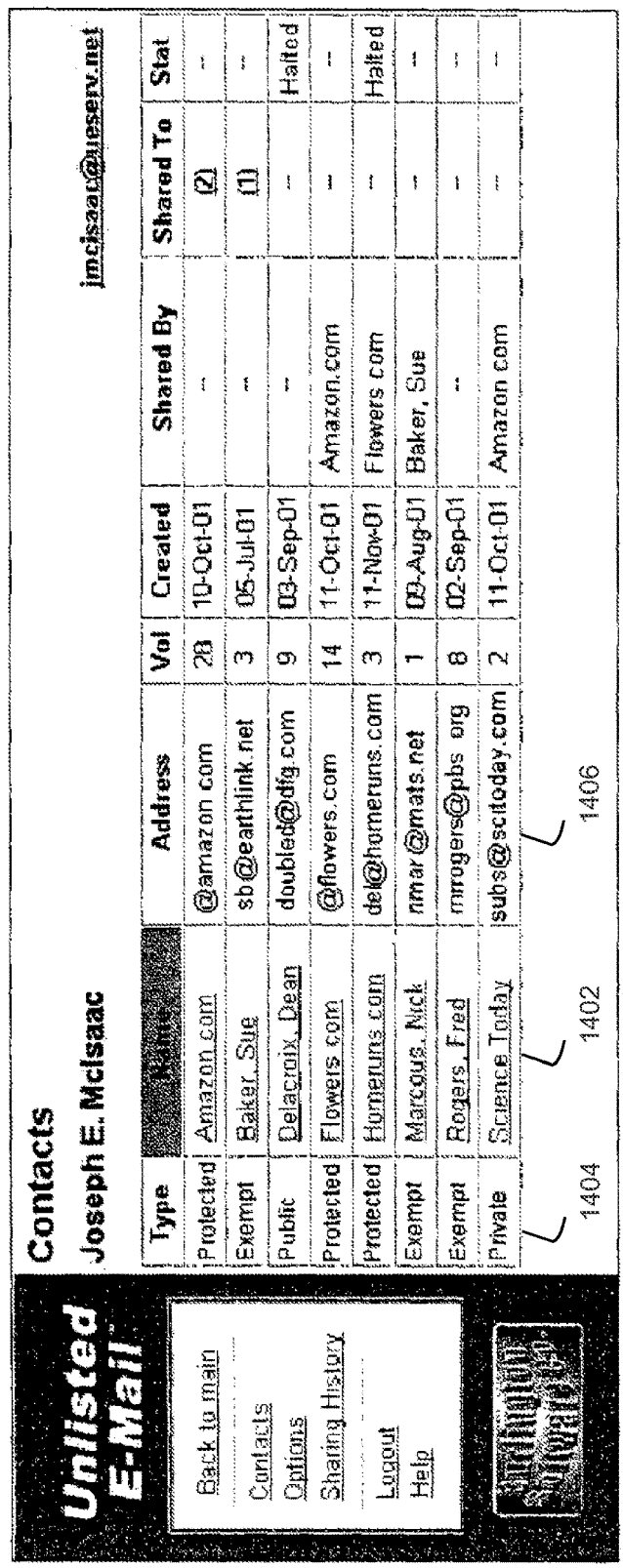
FIG. 14 shows a user interface for contacts.

FIG. 14 shows a user interface for contacts. As shown in FIG. 14, the contacts page may include a user interface 1400 indicating who is sharing a user's email address with whom, and the user can either stop the sharing or terminate (halt) the address altogether. The contacts page may show the names 1402 of contacts, the type 1404 (e.g., protected, exempt, public, private), an address 1406 for each contact, the volume of messages, the date the contact was created, who the contact was shared by or shared to, and the status of the contact (e.g., halted). A user can click on the name of a contact to drill down to contact details (as shown in the figure below).

Figure 15:
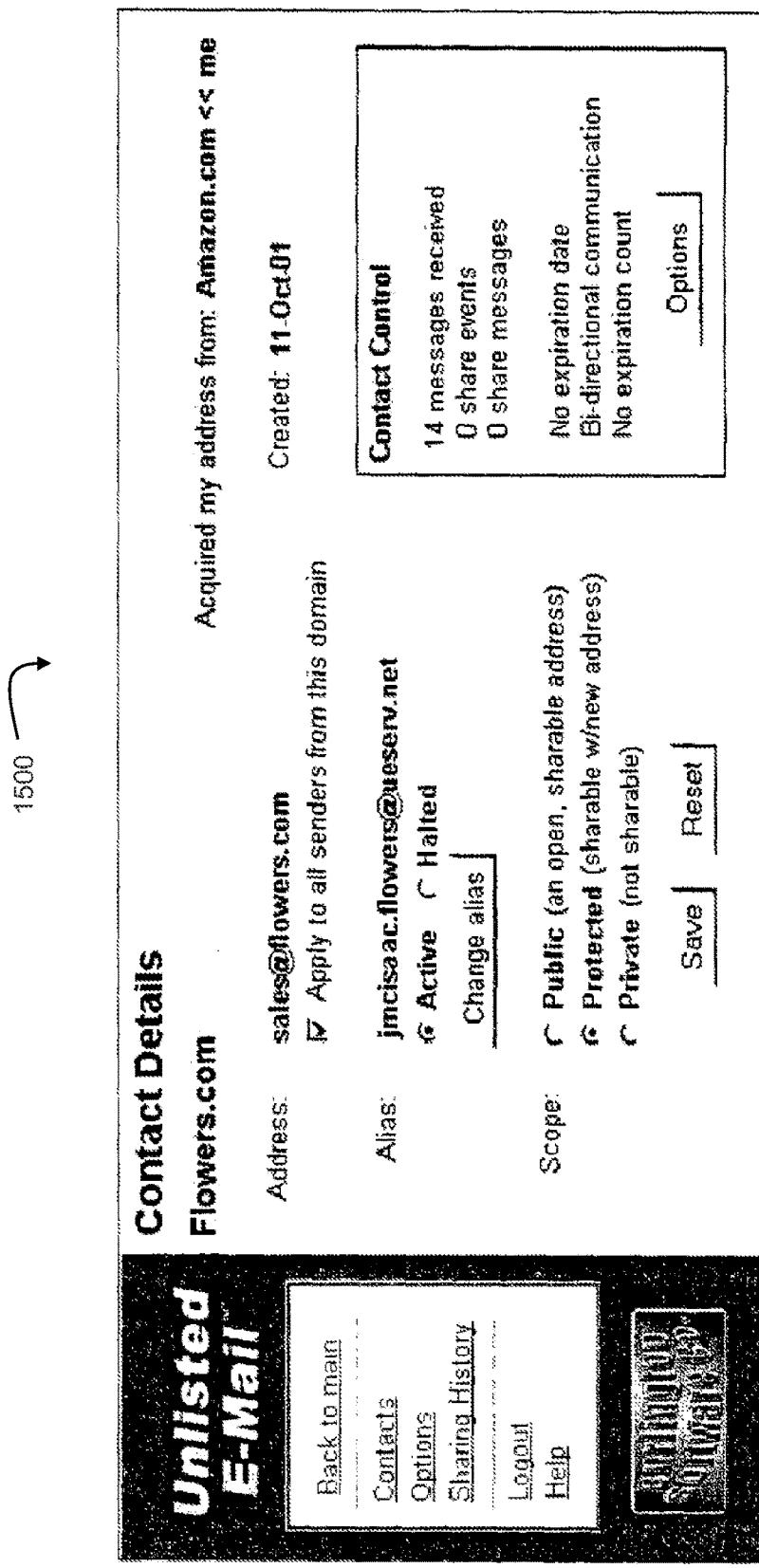
FIG. 15 shows a user interface for editing properties of contacts.

FIG. 15 shows a user interface 1500 for editing properties of contacts. As shown in FIG. 15, a user can edit the properties of a contact in a contact details page. The display may indicate where a sender acquired an address. The address and date of creation of a contact may be displayed, along with a check box for applying a rule for the contact to all senders from that domain. The alias of the user's email address may be displayed, along with a selection button for whether this alias should be active or halted for this contact. The alias may also be changed by the user. The scope for the particular contact (e.g., public (an open, sharable address), protected (sharable w/new address), and private (not sharable)), may also be selected using radio buttons in the user interface 1500. Details on the contact control may also be displayed including messages received, shared events, shared messages, expiration date, communication type (e.g., bidirectional), and expiration count. Other options may be included.

What is claimed is:

1. A method for managing communications to a true address of a user in a communication network, the method comprising:
    receiving an outbound communication from a communications infrastructure hosting the true address for the user, the outbound communication directed from the true address to one or more recipient addresses via a respective reply channel associated with the recipient address;
    generating an alias address for each one of the recipient addresses of the outbound communication to communicate with the true address;
    assigning one of a plurality of discrete security states as a security attribute to each alias address, the plurality of discrete security states including a first security state prohibiting sharing of the respective alias address and a second security state permitting sharing of the respective alias address, wherein the assigned discrete security state controls communications, via the respective reply channel, from one of the recipient addresses of the outbound communication through the communications infrastructure to the true address using a corresponding one of the alias addresses, wherein the assigned discrete security state is indicative of whether the respective recipient address of the outbound communication has permission to share the corresponding one of the alias addresses, and further wherein the security attribute is stored in a server and controllable by the user to alter the assigned discrete security state after sending the outbound communication;
    forwarding the outbound communication to the one or more recipient addresses through the communication network;
    receiving an inbound communication from a sender different from each one of the recipient addresses, the inbound communication addressed to one of the alias addresses for the true address;
    applying one or more rules based on at least a combination of an address of the sender of the inbound communication and the assigned discrete security state, wherein if the assigned discrete security state is the first security state, then the one or more rules include checking to determine if the sender of the inbound communication is permitted to send mail to the one of the alias addresses for the true address; and
    processing the inbound communication based on the one or more rules.

2. The method of claim 1, wherein the second security state includes a protected scope indicating that an incoming communication should be conditionally forwarded according to one or more rules.

3. The method of claim 2, wherein the one or more rules includes a whitelist authorizing delivery from one or more predetermined sender addresses.

4. The method of claim 2, wherein the one or more rules enforces domain-level sharing that authorizes delivery from any sender address within a predetermined domain.

5. The method of claim 1, further comprising assigning an exempt state to a sender address indicating that the sender address is exempt from processing according to the security attribute.

6. The method of claim 1, wherein the communications infrastructure includes an electronic mail infrastructure.

7. The method of claim 1, wherein the communications infrastructure includes an instant messaging infrastructure.

8. The method of claim 1, further comprising displaying a dashboard to the user in a user interface of an administration site, the dashboard containing information about senders using one or more of the alias addresses.

9. The method of claim 1, further comprising stripping identifiable information from a header of the outbound communication before forwarding.

10. The method of claim 9, wherein the identifiable information includes the true address.

11. A computer program product residing on a non-transitory computer readable medium having a plurality of instructions stored thereon which, when executed by a processor, cause that processor to perform the steps of:
    receiving an outbound communication from a communications infrastructure hosting a true address for a user, the outbound communication directed from the true address to one or more recipient addresses;
    generating an alias address for each one of the recipient addresses of the outbound communication to communicate with the true address via a respective reply channel associated with the recipient address;
    assigning one of a plurality of discrete security states as a security attribute to each alias address, the plurality of discrete security states including a first security state prohibiting sharing of the respective alias address and a second security state permitting sharing of the respective alias address, wherein the assigned discrete security state controls communications, via the respective reply channel, from one of the recipient addresses through the communications infrastructure to the true address using a corresponding one of the alias addresses, wherein the assigned discrete security state is indicative of whether the respective recipient address of the outbound communication has permission to share the corresponding one of the alias addresses, and further wherein the security attribute is stored in a server and controllable by the user to alter the assigned discrete security state after sending the outbound communication;
    forwarding the outbound communication to the one or more recipient addresses through a communication network;
    receiving an inbound communication from a sender different from each one of the recipient addresses, the inbound communication addressed to one of the alias addresses for the true address;
    applying one or more rules based on at least a combination of an address of the sender of the inbound communication and the assigned discrete security state, wherein if the assigned discrete security state is the first security state, then the one or more rules include checking to determine if the sender of the inbound communication is permitted to send mail to the one of the alias addresses for the true address; and
    processing the inbound communication based on the one or more rules.

12. The computer program product of claim 11, wherein the second security state includes a protected scope indicating that an incoming communication should be conditionally forwarded according to one or more rules.

13. The computer program product of claim 12, wherein the one or more rules includes a whitelist authorizing delivery from one or more predetermined sender addresses.

14. The computer program product of claim 12, wherein the one or more rules enforces domain-level sharing that authorizes delivery from any sender address within a predetermined domain.

15. A server for processing electronic mail messages, the server including:
- a first interface coupled to a source mail server and configured to receive inbound traffic;
- a second interface coupled to a destination mail server and configured to transmit outbound traffic; and
- a hardware processor configured to create an alias address for an outbound electronic mail message from a user hosted at the source mail server to a recipient hosted at the destination mail server for communication with the user via a reply channel associated with the recipient, to assign one of a plurality of discrete security states to the alias address, the plurality of discrete security states including a first security state prohibiting sharing of the alias address and a second security state permitting sharing of the alias address, to store the assigned discrete security state as a security attribute controllable by the user after sending the outbound electronic mail message, and to forward the outbound electronic mail message to the recipient, wherein the assigned discrete security state is indicative of whether the recipient has permission to share the alias address, to receive an inbound communication from a sender different from the recipient of the outbound electronic mail message, the inbound communication addressed to the alias address, to apply one or more rules based on at least a combination of an address of the sender of the inbound communication and the assigned discrete security state, wherein if the assigned discrete security state is the first security state, then the one or more rules include checking to determine if the sender of the inbound communication is permitted to send mail to the alias address, and to process the inbound communication based on the one or more rules.

* * * * *